Dec. 26, 1933.      V. V. VEENSCHOTEN      1,940,828
FEED WATER REGULATOR
Filed Dec. 30, 1931      3 Sheets-Sheet 1

INVENTOR:
Vincent V. Veenschoten
By E J Andrews
Atty.

Patented Dec. 26, 1933

1,940,828

UNITED STATES PATENT OFFICE 1,940,828

FEED WATER REGULATOR

Vincent V. Veenschoten, Erie, Pa., assignor to Northern Equipment Company, Erie, Pa., a corporation of Pennsylvania Application December 30, 1931. Serial No. 583,913

19 Claims. (Cl. 122—451)

This invention relates to feed water regulators, the object of which is to supply water to boilers and the like, in accordance with the rate of flow of the steam from the boiler, and according to variations in the boiler water level elevation and the flow of water itself. Another object is to provide various compensating means in order to maintain the water level substantially constant or within such limits as may be desired. The invention contemplates the use of electric and hydraulic means for controlling the flow of water to the boiler, and one of the objects has been to dispense not only with the ordinary thermostat or float means, but also to dispense with the use of levers or similarly moving parts, so as to materially decrease the complications of the system.

Figures 1, 2:
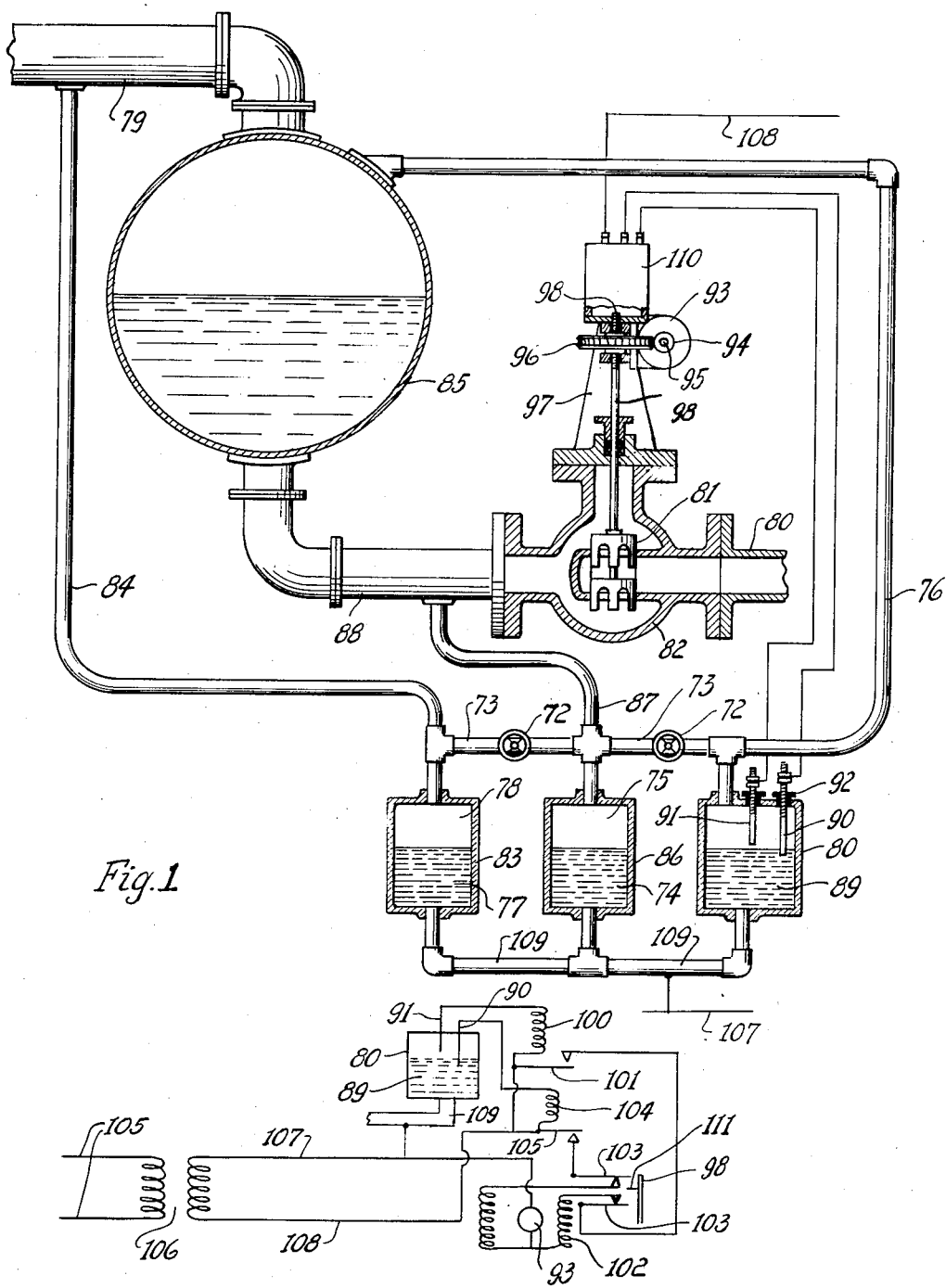
Figure 3:
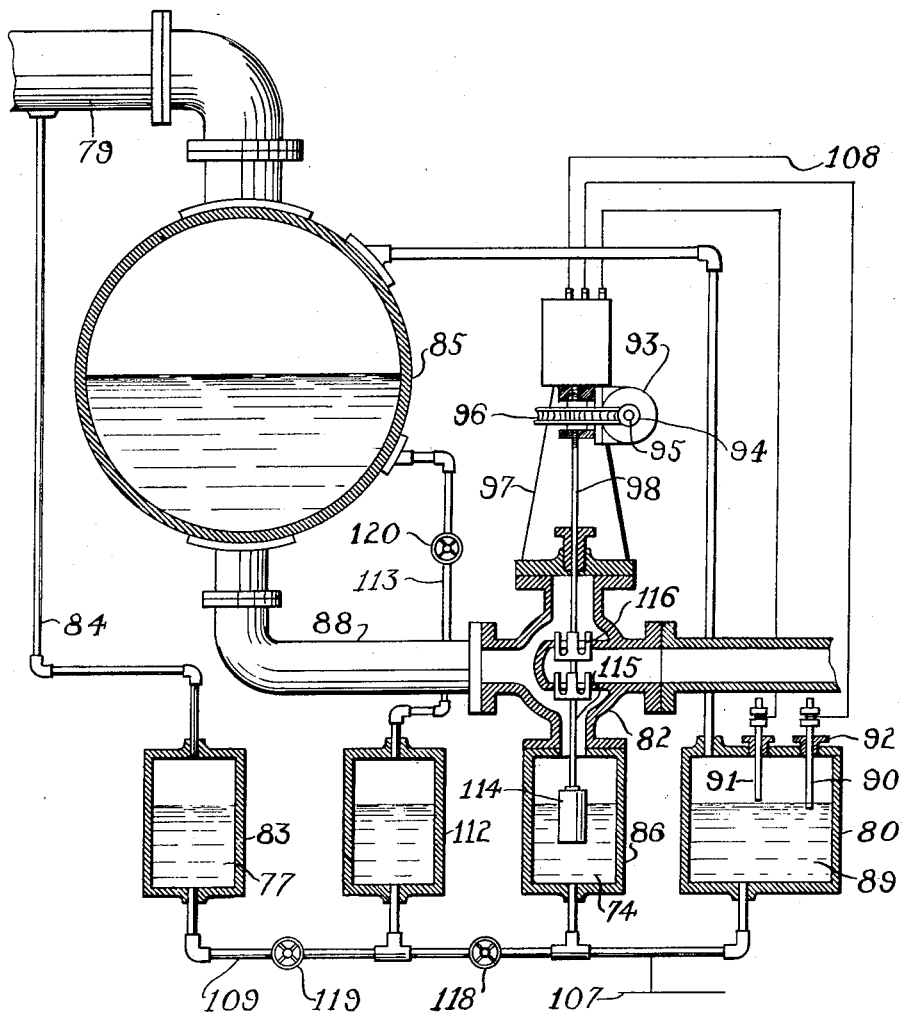
Figure 4:
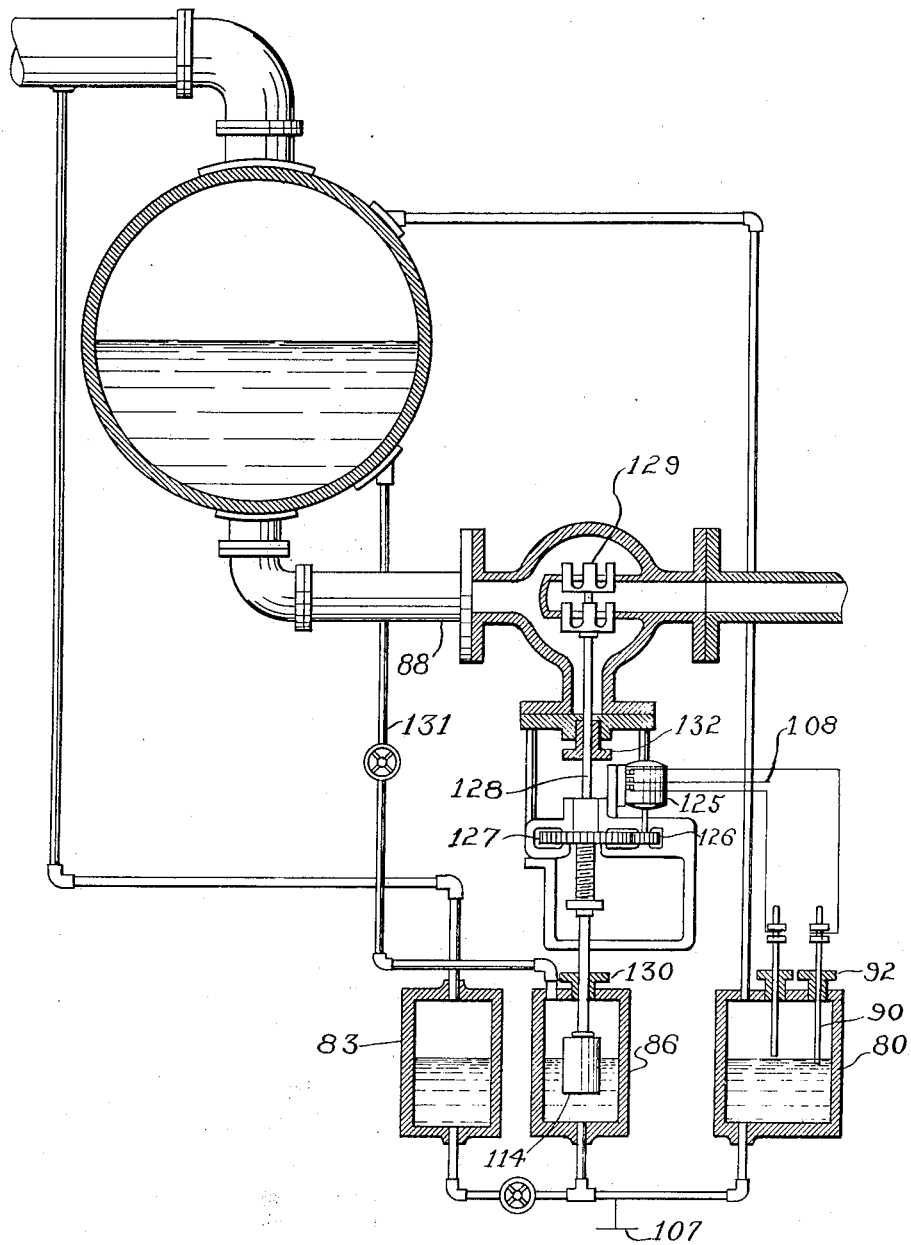

Of the accompanying drawings, Fig. 1 is a more or less diagrammatic sectional elevation of a boiler system and the means for regulating the flow of water thereto; Fig. 2 shows diagrammatically the electric system of Fig. 1; Fig. 3 is a sectional elevation of a modified form of the feed water regulator system; and Fig. 4 shows a further modification of the system.

In the operation of many modern boilers, it is desired to operate the boiler system at very high steam pressures, and often at capacities far beyond the normal rated capacity, and often with very material and sudden changes in load or in fire intensity. In such cases, the control of the water level elevation in the boiler must be according to the various needs and under very sensitive control, so as to prevent abnormally high or low levels, and in order to avoid flooding or emptying the boiler inadvertently. For these purposes, the system which I illustrate and describe herein is particularly applicable.

With feed water systems, it is now customary to have means responsive to the variations in the steam flow from the boiler for controlling the flow of water to the boiler; the aim being ordinarily to maintain substantially equal the mass of water and steam flowing into and from the boiler. It has been common in the past to provide such water flow control means by the use of thermostatic tubes, floats, or the like. In this case, I provide such means by the use of mercury columns, with electric means associating the mercury columns with the feed water valve operating mechanism.

The boiler 85 is supplied with water through the supply pipe 88, the flow being controlled by the feed water valve 82 by means of the valve plunger 81. The supply of water is received through the pipe 80 from any suitable source of supply under suitable pressure. The plunger 81 is operated, by suitable operating means, so as to supply water to the boiler ordinarily at a rate substantially equal to the rate of flow of steam from the boiler through the steam main 79. The apparatus for supplying water at this rate is responsive to the rate of flow of steam from the boiler.

This apparatus comprises a pipe 84 which is directly or indirectly connected to the steam main 79 of the boiler. This pipe is connected also to a container 83 having a chamber 78. In the lower portion of the chamber is a suitable mass of mercury 77. In operation, the steam will pass from the steam main into the pipe 84 and condense therein, so that the pipe will always be full of water which passes downwardly on the surface of the mercury. This pressure is increased by the steam pressure in the main, and the steam pressure in the main varies with the variations in flow therethrough.

The container 83 is connected by a pipe 109 with a container 80, in the lower portion of which is a mass of mercury 89. The upper portion of this container is connected by a pipe 76 with the steam space of the boiler. The vertical portion of this pipe also, when in operation, will always be full of water which condenses from the steam.

As a consequence of this arrangement, it will be seen that the mercury columns in the two vessels 83 and 80, together with the pressures on the upper surfaces of the mercury, will balance each other. Hence, if the pressure in either vessel varies, the relative mercury levels will also vary in elevation. When the steam flow in the boiler is uniform, the two mercury levels will assume a definite relation with reference to each other. If, however, the steam flow is decreased by closing somewhat the throttle valve to the turbine or other apparatus, the pressure in the pipe 79 will increase with reference to the pressure in the boiler, and the mercury level in the container 83 will be forced downwardly, and this will force upwardly the mercury in the container 80.

Mounted in the container 80 are electric contact members 90 and 91. Normally, the contact 90 is immersed in the mercury and the contact 91 is suspended above the mercury. These contacts are insulated from the container 80 by insulating plugs 92, and they are threaded into these plugs so that the lower ends of the contacts can be raised or lowered to suit the particular needs. These contacts are suitably connected with an electric motor 93 which, by means of the screw 94 mounted on the shaft 95 of the motor, is adapted to operate a screw wheel 96. This wheel is rotatably mounted on the pedestal 97, and the stem 98 of the plunger 81 is threaded into the wheel so that, as the wheel rotates, the plunger is elevated or lowered.

The electric current comes from the supply leads 105, Fig. 2, through the transformer 106, if necessary, to the lines 107 and 108. By suitable electric arrangements, as illustrated diagrammatically, when the load on the boiler is decreased, the increased pressure in the main 79 forces the mercury 89 upwardly. As the mercury comes in contact with the contact 91, an electric relay circuit is closed through the pipe 109, the mercury 89, the contact 91, coil 100, and line 108. Coil 100, by suitable means, closes the switch 101, thus closing the motor circuit from line 107 to the motor 93, field coil 102, lower switch 103, switch 101, and line 108. The motor is then operated in the direction to close more the valve 82, so as to decrease the flow of water to the boiler in accordance with the decreased flow of steam therefrom.

However, when the motor circuit is closed by the mercury 89 coming in contact with the contact 91, the motor would continue to operate unless means were provided for opening the circuit and, in such a case, the feed water valve 82 would be completely closed. One means which I provide for opening the circuit before the valve is closed comprises a container 86 having a chamber 75 which also has mercury 74 in the lower portion and is connected by the pipe 109 with the containers 80 and 83. The chamber 75 is also connected by a pipe 87 to the water supply pipe 88. When the valve 82 is closed more by the motor, decreasing the flow of water therethrough, the water pressure in the pipe 88 and, hence, in the pipe 87, will decrease and this will decrease the pressure on the mercury 74 and allow the mercury 89 to sink somewhat and break the contact with the contact 91. If the various elements are properly arranged relative to each other, the motor circuit will be broken when the plunger 81 has moved sufficiently to allow the flow of water therethrough substantially to equal the decreased flow of steam from the boiler.

It will be understood that this entire process will be reversed when the throttle valve of the steam main is open more, so as to increase the load on the boiler. In such a case, the pressure in the pipe 84 will be decreased and the mercury 89 will sink somewhat. This, if the change is sufficient, will break the contact between the mercury 89 and the contact 90. This will allow coil 104 to close switch 105 and the motor circuit will be closed through switches 103 and 105 so as to operate the motor in the opposite direction and open more the feed-water valve.

In the ordinary operation of a steam boiler of this nature, other means are used to prevent abnormal variations in the water level elevation in the boiler. Such means ordinarily are directly responsive to the variations in the water level. The means which I have described are also responsive to such water level variations. While the elevation of the mercury 74 is affected by variations in pressure in the pipe 88, it is also affected by variations in the water level elevation in the boiler. Any increase in the elevation of the water level will increase the back pressure in the pipe 88 and, hence, in the pipe 87. As a consequence, the increase in pressure will tend to force the mercury 74 downwardly, irrespective of any change in opening of the valves 82. This will force upwardly the mercury 89 and close the mercury circuit through the contact 91, thus closing more the valve 92 to compensate for the increased water level in the boiler.

Although I have described herein means responsive to the variations in the steam flow in the steam main for controlling the flow of water to the boiler, yet it is to be understood that such means may be omitted from the system if desired. For instance, the container 83 and the pipe 84 may be removed and the remaining apparatus will operate as an ordinary feed water regulator system responsive to the variations in water level in the boiler. In such a case, the motor will be controlled by the variations in water level, and the variations in pressure in the pipe 88 will act to open or close the motor circuit, so as to prevent over-running of the valve under the operation of the water level variations. However, the variation in the water level itself produced by the variation in the valve will break the motor circuit ordinarily before any abnormal changes in the water level occurs. This operation, however, will lag behind the variation in the feed water valve materially. Hence, to avoid undesirable variations in water level, the compensating means connecting the container 86 to the pipe 88 is desirable. The pipe 87 might be connected directly to the water space of the boiler instead of to the pipe 88 and, thus, obtain the effect of the water level variations without being affected by the water flow variations and, in some cases, this may be desired.

However, as a margin of safety, I prefer to provide other means for opening the motor circuit to prevent serious over-running of the valve plunger. These means comprise the switches 103. The stem 98 passes upwardly into the casing 110 and in this casing are mounted the switches 103. Fixed to the stem in the casing is a finger 111 which is adapted to open the upper switch 103 when the plunger 81 has been raised a predetermined amount, so as to avoid opening the valve sufficiently to flood the boiler. Or, as the valve is closing, the finger is arranged to open the lower switch 103 and to prevent entire closing of the valve. Obviously, the maximum opening and closing of the valve may by these means be predetermined as may be desired.

For practical reasons, I prefer to connect the containers by pipes 73 controlled by valves 72. This assists in filling the containers with water when first starting up and prevents the possibility of undesirable displacement of mercury in case the pressure in any of the lines is less than normal. Also, by placing a valve in the pipe 109 between the containers 83 and 86, the system may be operated without the steam flow control. By closing this valve and the corresponding valve 72, the system will be responsive to the water level and water flow changes only.

Fig. 3 illustrates a modified form of the feed water regulator system, in which the containers 80, 83 and 86 are used, together with a container 112. The container 112 is connected by a pipe 113 to the water space of the boiler. The container 86, as before, is in communication with the pipe 88. But, in this instance, the container is directly connected to the casing of the valve 82 instead of through the pipe 87.

Also, in the container 86 is mounted a displacement mass 114 which is connected to a rod 115, which is a continuation of the valve stem 98. This displacement mass is thus raised or lowered in the mercury 74 as the valve is closed or opened more. Also, in this instance, the valve plunger 116 is inverted with reference to the valve plunger 81, so that the valve closes as it moves upwardly instead of downwardly.

It will thus be seen that this system differs from the system of Fig. 1 in the inclusion of the container 112. This container, being connected to the water space of the boiler, is directly responsive to the water level changes in the boiler. As has been hereinabove described, as the water level in the boiler rises, the mercury in the container 112 will be forced downwardly and this, in turn, will force upwardly the mercury 89 and will close the motor circuit through the contact 91. The arrangement of the winding of the motor circuit in this case is such that, in closing this circuit, the motor will be operated to move the valve plunger 116 upwardly instead of downwardly when the water level reaches a predetermined elevation.

The reason for moving the valve plunger 116 upwardly to close the valve is to properly operate the displacement member 114. This member is intended to vary the elevation of the mercury 74 as the valve is operated. Assuming that the steam pressure in the pipe 79 is increased, thus forcing downwardly the mercury 77 and forcing upwardly the mercury 89, so as to close the motor circuit through the contact 91, the motor will then operate the valve plunger so as to close more the valve 82. This will move upwardly the displacement member 114 and allow the mercury 74 to sink. But, this in turn will allow the mercury 89 to sink somewhat and break the contact with the contact 91 and stop the motor. So that, in this case, I have provided this additional compensating means for preventing over-running of the plunger 116. It will be understood, however, that the variations in pressure in the outlet of the valve 82, which are transmitted immediately to the container 86, will have the effect of preventing over-running of the valve. Also, the variation in water level elevation in the boiler will ultimately have this effect; and the limit switches 103 may also be used with this system as with the system of Fig. 1.

With this system, it will be seen that, by closing the valve 119, the steam flow means are eliminated, and the system is subject only to the water level and water flow variations. Also, by closing valve 119 or 120, the container 83 or 112 will be eliminated. By closing valve 118, both will be eliminated. The system will then still be subject to water level variations, but the water level effect will be decreased.

It will be understood that various adjustments may be made. By elevating the contacts 90 and 91, the normal boiler water level will be raised. By raising contact 91 or lowering contact 90, the range of levels will be increased. By varying the cross section of any container or the mass 114, its effect will be varied accordingly. Or, by varying the opening of the valves 118 or 119, the lag in the effect of the containers 112 or 83 may be varied accordingly.

The modification of Fig. 4 is somewhat similar to Fig. 3, but in this case the motor and operating mechanism is mounted between the valve and the container 86. This mechanism comprises the motor 125 arranged to operate a pinion 126, and this in turn operates a gear wheel 127. The stem 128 of the valve plunger 129 is threaded into the gear wheel, and the plunger is operated in accordance with the variations in pressure in the containers 80, 86 and 83, as in the case of the modifications of Figs. 1 and 3. The electric circuits for operating the motor may be similar to those illustrated by Fig. 2, and the limit switches 103 may be applied in a similar manner.

In this case, the displacement member 114 is connected to the valve stem 128, as in case of Fig. 3, but the stem passes through the stuffing boxes 130 and 131, it being understood that, with the motor operation, the friction of the stuffing boxes is not materially objectionable. The operation of the motor is such, as in case of Fig. 3, that the valve is closed by moving upwardly, and the upward movement of the displacement member 114 will allow the mercury in the vessel 80 to move downwardly and break the circuit which is closing the valve.

In this case, the container 86 is connected to the water space of the boiler by means of the pipe 131. Hence, the variations in pressure in the outlet of the feed water valve or the feed water pipe 88 have no effect on the operation of the mechanism.

I claim as my invention:

1. In a boiler system having a steam main and a water supply pipe, a feed water regulator system comprising a valve mounted in said pipe, and means for varying the opening of said valve, said means comprising a first and a second closed container, each container containing a mass of mercury, means providing communication between the lower portions of said containers, means providing communication between the upper portion of said first container and the steam space of the boiler of said system, means providing communication between the upper portion of said second container and said steam main, and electric contacts mounted in said first container one above and the other below the normal mercury level therein, said contacts being operatively associated with said valve.

2. In a boiler system as claimed in claim 1, a third container containing mercury, the lower portion of said third container being in communication with said first container, and means providing communication between the upper portion of said third container and said water supply pipe, the mercury in said third container by virtue of said latter communication means being responsive to variations in the liquid pressure in said supply pipe.

3. In a boiler system having a steam main and a water supply pipe, a feed water regulator system comprising a valve mounted in said pipe, and means for varying the opening of said valve, said means comprising a first and a second closed container, each container containing a mass of mercury, means providing communication between the lower portions of said containers, means providing communication between the upper portion of said first container and the steam space of the boiler of said system, means providing communication between the upper portion of said second container and the water space of the boiler, electric contacts mounted in said first container one above and the other below the normal mercury level therein, said contacts being operatively associated with said valve, and a displacement mass mounted in one of said containers and operatively connected with the plunger of the valve.

4. In a boiler system as claimed in claim 1, a third container containing mercury, the lower portion of said container being in communication with said first container, means providing communication between the upper portion of said third container and said supply pipe, a fourth container containing mercury, the lower portion of said fourth container being in communication with said first container, and means providing communication between the upper portion of said fourth container and the water space of the boiler.

5. In a boiler system as claimed in claim 1, a third container containing mercury, the lower portion of said third container being in communication with said first container, and means providing communication between the upper portion of said third container and said water supply pipe, the mercury in said third container by virtue of said latter communication means being responsive to variations in the liquid pressure in said supply pipe, and a displacement mass mounted in said third container, said mass being operatively connected with the plunger of said valve.

6. In a boiler system as claimed in claim 1, a third container containing mercury, the lower portion of said third container being in communication with said first container, and means providing communication between the upper portion of said third container and said water supply pipe, the mercury in said third container by virtue of said latter communication means being responsive to variations in the liquid pressure in said supply pipe, a displacement mass mounted in said third container, said mass being operatively connected with the plunger of said valve, and a fourth container containing mercury, the lower portion of said fourth container being in communication with said first container, and the upper portion of said fourth container being in communication with the water space of the boiler.

7. In a boiler system having a steam main and a water supply pipe, a feed water regulator system comprising a valve mounted in said supply pipe, and means for varying the opening of said valve, said means comprising a container, mercury contained in said container, electric contact means mounted adjacent the surface of said mercury, operative means associating said contacts with the said valve, and means responsive to the variations in steam pressure in said main for varying the height of said mercury in said container, and means responsive to the variations in movement of the valve for varying the elevation of the mercury level in said container.

8. In a boiler system having a steam main and a water supply pipe, a feed water regulator system comprising a valve mounted in said pipe, and means for varying the opening of said valve, said means comprising two containers, each container containing a mass of mercury, means providing communication between the lower portions of said containers, means providing communication between the upper portion of one container and the steam space of the boiler of said system, means providing communication between the upper portion of the other container and said steam main, and electric contacts mounted in one container one above and the other below the normal mercury level therein, said contacts being operatively associated with said valve.

9. In a boiler system having a steam main and a water supply pipe, a feed water regulator system comprising a valve mounted in said pipe, and means for varying the opening of said valve, said means comprising two containers, each container containing a mass of mercury, means providing communication between the lower portions of said containers, means providing communication between the upper portion of one container and the steam space of the boiler of said system, means providing communication between the upper portion of the other container and said supply pipe, and electric contacts mounted in one container one above and the other below the normal mercury level therein, said contacts being operatively associated with said valve.

10. In a boiler system having a steam main and a water supply pipe, a feed water regulator system comprising a valve mounted in said pipe, means for varying the opening of said valve, said means comprising two containers, each container containing a mass of mercury, means providing communication between the lower portions of said containers, means providing communication between the upper portion of one container and the steam space of the boiler of said system, means providing communication between the upper portion of the other container and said supply pipe, and electric contacts mounted in one container one above and the other below the normal mercury level therein, said contacts being operatively associated with said valve, and a displacement mass mounted in said other container and operatively connected to said valve.

11. In a boiler system having a steam main and a water supply pipe, a feed water regulator system comprising a valve mounted in said pipe, means for varying the opening of said valve, said means comprising two containers, each container containing a mass of mercury, means providing communication between the lower portions of said containers, means providing communication between the upper portion of one container and the steam space of the boiler of said system, means providing communication between the upper portion of the other container and said supply pipe, and electric contacts mounted in one container one above and the other below the normal mercury level therein, said contacts being operatively associated with said valve, and a displacement mass mounted in said other container and operatively connected with said valve through said means, providing communication between the upper portion of the latter container and the supply pipe.

12. In a boiler system having a steam main and a water supply pipe, a feed water regulator system comprising a valve mounted in said pipe, means for varying the opening of said valve, said means comprising two containers, each container containing a mass of mercury, means providing communication between the lower portions of said containers, means providing communication between the upper portion of one container and the steam space of the boiler of said system, the other container being connected to the casing of said valve with a passageway providing communication between the latter container and the valve casing, and a displacement mass mounted in said latter container and operatively connected through said passageway with said valve.

13. In a boiler system having a steam main and a water supply pipe, a feed water regulator system comprising a valve mounted in said supply pipe, means for varying the opening of said valve, said means comprising a container, mercury contained in said container, electric contact means mounted adjacent the surface of said mercury, operative means associating said contacts with the said valve, and means responsive to the steam and water pressure in the boiler of said system and to the movement of said valve for varying the elevation of said mercury surface.

14. In a boiler system having a steam main and a water supply pipe, a feed water regulator system comprising a valve mounted in said supply pipe, and means for varying the opening of said valve, said means comprising a container, mercury contained in said container, electric contact means mounted adjacent the surface of said mercury, operative means associating said contacts with the said valve, and means responsive to the steam and water pressure in the boiler of said system and to the steam pressure in said main for varying the elevation of said mercury surface.

15. In a boiler system as claimed in claim 14, means responsive to the movement of the valve for varying the elevation of the surface of the mercury.

16. In a boiler system having a steam main and a water supply pipe, a feed water regulator system comprising a valve mounted in said supply pipe, and means for varying the opening of said valve, said means comprising a container, mercury contained in said container, electric contact means mounted adjacent the surface of said mercury, operative means associating said contacts with the said valve, and means responsive to the steam pressure in the boiler of the system and to the water pressure in the supply pipe and to the movement of said valve for varying the elevation of said mercury surface.

17. In a boiler system having a steam main and a water supply pipe, a feed water regulator system comprising a valve mounted in said supply pipe, means for varying the opening of said valve, said means comprising a container, mercury contained in said container, electric contact means mounted adjacent the surface of said mercury, operative means associating said contacts with the said valve, and means responsive to the steam pressure in the boiler and to the movement of said valve for varying the elevation of the surface of the mercury.

18. In a boiler system having a steam main and a water supply pipe, a feed water regulator system comprising a valve mounted in said supply pipe, means for varying the opening of said valve, said means comprising a container, mercury contained in said container, electric contact means mounted adjacent the surface of said mercury, operative means associating said contacts with the said valve, and means responsive to the water pressure in the supply pipe and also to the movement of said valve for varying the elevation of the surface of the mercury.

19. In a boiler system having a steam main and a water supply pipe, a feed water regulator system comprising a valve mounted in said supply pipe, means for varying the opening of said valve, said means comprising a container, mercury contained in said container, electric contact means mounted adjacent the surface of said mercury, operative means associating said contacts with the said valve, and means responsive to the steam and water pressure in the boiler of said system and to the water pressure in said supply pipe for varying the elevation of the surface of the mercury.

VINCENT V. VEENSCHOTEN.